(12) United States Patent
Fan

(10) Patent No.: US 7,626,729 B2
(45) Date of Patent: Dec. 1, 2009

(54) HALFTONING WITH COLOR ERROR DIFFUSION OF ONE SEPARATION BASED ON COLOR ERROR DIFFUSION OF A PREVIOUS SEPARATION

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 699 days.

(21) Appl. No.: 11/070,420

(22) Filed: Mar. 2, 2005

(65) Prior Publication Data

US 2006/0197988 A1 Sep. 7, 2006

(51) Int. Cl.
*H04N 1/40* (2006.01)
*H04N 1/405* (2006.01)
*H04N 1/46* (2006.01)
*G06K 15/00* (2006.01)

(52) U.S. Cl. .............. 358/3.03; 358/3.01; 358/3.05; 358/515

(58) Field of Classification Search ........... 358/3.05, 358/3.03, 3.01, 1.9, 1.1, 500, 515; 382/162, 382/167
See application file for complete search history.

(56) References Cited

U.S. PATENT DOCUMENTS

| | | | |
|---|---|---|---|
| 5,210,602 A | 5/1993 | Mintzer et al. | |
| 5,565,994 A * | 10/1996 | Eschbach | 358/3.03 |
| 5,708,728 A * | 1/1998 | Nomura | 382/162 |
| 5,784,496 A * | 7/1998 | Mantell | 382/237 |
| 5,854,882 A | 12/1998 | Wang et al. | |
| 5,973,794 A * | 10/1999 | Kim | 358/3.03 |
| 6,014,233 A | 1/2000 | Fan et al. | |
| 6,072,901 A * | 6/2000 | Balonon-Rosen et al. | 382/167 |
| 6,535,635 B1 | 3/2003 | Klassen et al. | |
| 6,760,127 B1 | 7/2004 | Shin et al. | |
| 2001/0019632 A1* | 9/2001 | Shibaki et al. | 382/252 |
| 2004/0100646 A1* | 5/2004 | Quintana | 358/1.9 |

FOREIGN PATENT DOCUMENTS

| | | |
|---|---|---|
| EP | 0887998 | 12/1998 |
| EP | 1318664 | 6/2003 |

OTHER PUBLICATIONS

Damera-Venkata et al., "Color Error Diffusion Halftoning", IEEE Signal Processing Magazine, vol. 20, No. 4, pp. 51-58 (Jul. 2003).
Fan et al., "Improved quantization methods in color error diffusion", Journal of Electronic Imaging, vol. 8, No. 4, pp. 430-438 (Oct. 1999).

* cited by examiner

*Primary Examiner*—King Y Poon
*Assistant Examiner*—Ming Hon
(74) *Attorney, Agent, or Firm*—Miele Law Group PC

(57) ABSTRACT

Embodiments include a method for halftoning a source image. The halftoning includes error diffusion processing of a first separation of plural color separations of a pre-rendered image after error diffusion processing a second separation of the plural color separations of the pre-rendered image. The error diffusion processing of the first separation including, for respective pixel values corresponding to the first separation, choosing respective magnitudes of the respective pixel values as a function of the error diffusion processing of the second separation. A rendered image is output which comprises the same plural color separations. The output rendered image is populated with, for the first separation, pixel information based on the respective magnitudes.

18 Claims, 4 Drawing Sheets

HALFTONING WITH COLOR ERROR DIFFUSION OF ONE SEPARATION BASED ON COLOR ERROR DIFFUSION OF A PREVIOUS SEPARATION

BACKGROUND

Aspects of the disclosure relate to methods of halftoning continuous tone images. Other aspects relate to error diffusion methods for halftoning.

A given image may comprise a pattern (e.g., an array) of pixels. Each pixel corresponds to a defined location in the image (e.g., a grid cell), and comprises tone information. Tone information for a given point (e.g., corresponding to a pixel) or region of an image generally comprises a color component (related to one or more frequencies of visible light) and an intensity component (related to a radiant intensity of the pixel).

In a color image, by way of example, a given pixel may have tone information defined in terms of three color values—R for red, G for green, and B for blue. In simplified terms, the magnitude of each of these values represents the intensity of the individual color at the pixel's location. In a grayscale image, a pixel generally has only one color value—gray, and its magnitude is representative of the shade of gray (generally related to the intensity of that color) in the pixel.

Halftoning involves taking a source image (typically referred to as a "continuous-tone image") which contains a certain amount of tone information and converting it to a target image with less tone information.

In the context of grayscale halftoning, this may involve in some implementations, e.g., converting a continuous-tone grayscale image (e.g., with each pixel having an 8 bit gray value—and therefore defined in terms of one of among 256 different shades of gray) to a halftoned grayscale image (e.g., with each pixel having only a 1 bit gray value—and therefore defined in terms of one of two different shades of gray (typically black or white)). In the context of color halftoning, this may involve, e.g., converting a continuous-tone color image (e.g., a CMYK image with each pixel having C (cyan), M (magenta), Y (yellow), and B (black) values each comprising 8 bits) to a halftoned color image (e.g., a CMYK image with each pixel having CMYK values each comprising only one bit).

In digital color halftoning, the rendering device may be binary in nature, which means that for every available color of ink, it produces either a dot or pixel or no dot or pixel at any given location. Several digital halftoning methods exist, including error diffusion. An error diffusion method may include a quantization process followed by a process of filtering or diffusing the error from the quantization task. Generally, during quantization, pixels are given modified intensity values based on intensity values of the pixel in the original image plus weighted error values of certain processed pixels. These modified intensity values are then compared to a threshold, and a given modified intensity value is turned on or off in the halftoned image depending on the result of the comparison. The error in the quantization task (e.g., the difference between the pixel's actual intensity and the threshold) is then diffused by adding it to the levels of neighboring pixels.

Two types of error diffusion for digital color halftoning include scalar error diffusion and vector error diffusion. Both process images with multiple color layers (often referred to as separations). In scalar error diffusion, each separation is processed separately, without regard to the results or errors in halftoning the other layers. In vector error diffusion, two or more separations are processed together, and the results and errors made in processing one separation are taken into account in the processing of the others.

SUMMARY

Embodiments include a method for halftoning a source image. The halftoning includes error diffusion processing of a first separation of plural color separations of a pre-rendered image after error diffusion processing a second separation of the plural color separations of the pre-rendered image. The error diffusion processing of the first separation includes, for respective pixel values corresponding to the first separation, choosing respective magnitudes of the respective pixel values as a function of the error diffusion processing of the second separation. A rendered image is output which includes the same plural color separations. The output rendered image is populated with, for the first separation, pixel information based on the respective magnitudes.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
FIG. 1 is a schematic illustration of an image that may be processed using methods according to embodiments of the invention.

FIG. 1 is a schematic illustration of an image 10 to be processed. The illustrated image 10 represents a continuous tone image. For purposes of this description, a continuous tone image may be considered to be any image having more tone information than can be reproduced by a given rendering unit. Image 10 may be a continuous tone image of any type or origin, including a photographic image, a digital image, or an image created in one medium and then digitized. Additionally, image 10 need not be a picture; instead, image 10 may comprise any combination of text and graphic matter.

Image 10 may be halftoned by different types of rendering devices, e.g., including printers of various types, office document processing systems and general computing systems. The halftoned image may be ultimately presented or displayed in a printed document, on a computer monitor, or on another device with a limited number of available colors.

Figure 2:
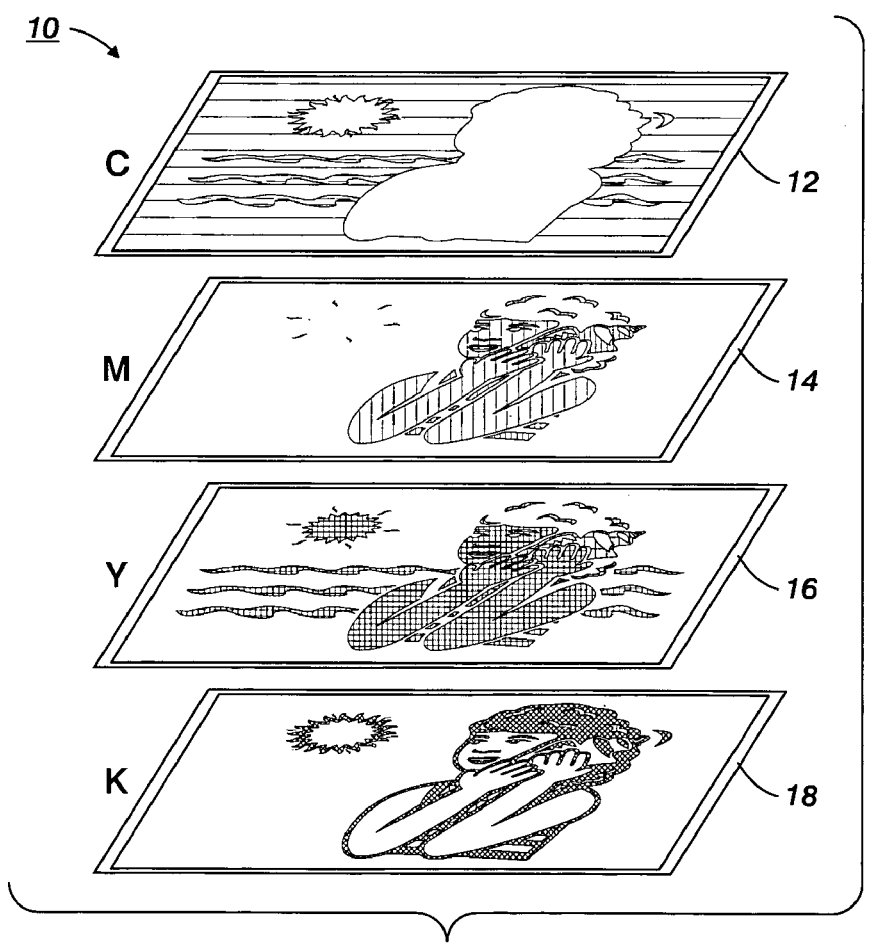
FIG. 2 is a schematic illustration of the image of FIG. 1 as represented by four color layers or separations in a CMYK color halftoning scheme.

In halftoning a continuous tone image, such as image 10, the rendering device may display the target image with a discrete set of color layers (called separations) that, when combined, are perceived by the human eye as conveying the range of tone information present in the source image. FIG. 2 shows an exemplary set of color separations for image 10 using cyan, magenta, yellow, and black (CMYK). Other color schemes (otherwise called color spaces) may be used. As shown in FIG. 2, image 10, in the CMYK scheme, may comprise a cyan separation 12, a magenta separation 14, a yellow separation 16, and a black separation 18. An image is rendered when it is stored, represented, or output in a form compatible for display or printing, or when the image is displayed or printed.

Figure 3:
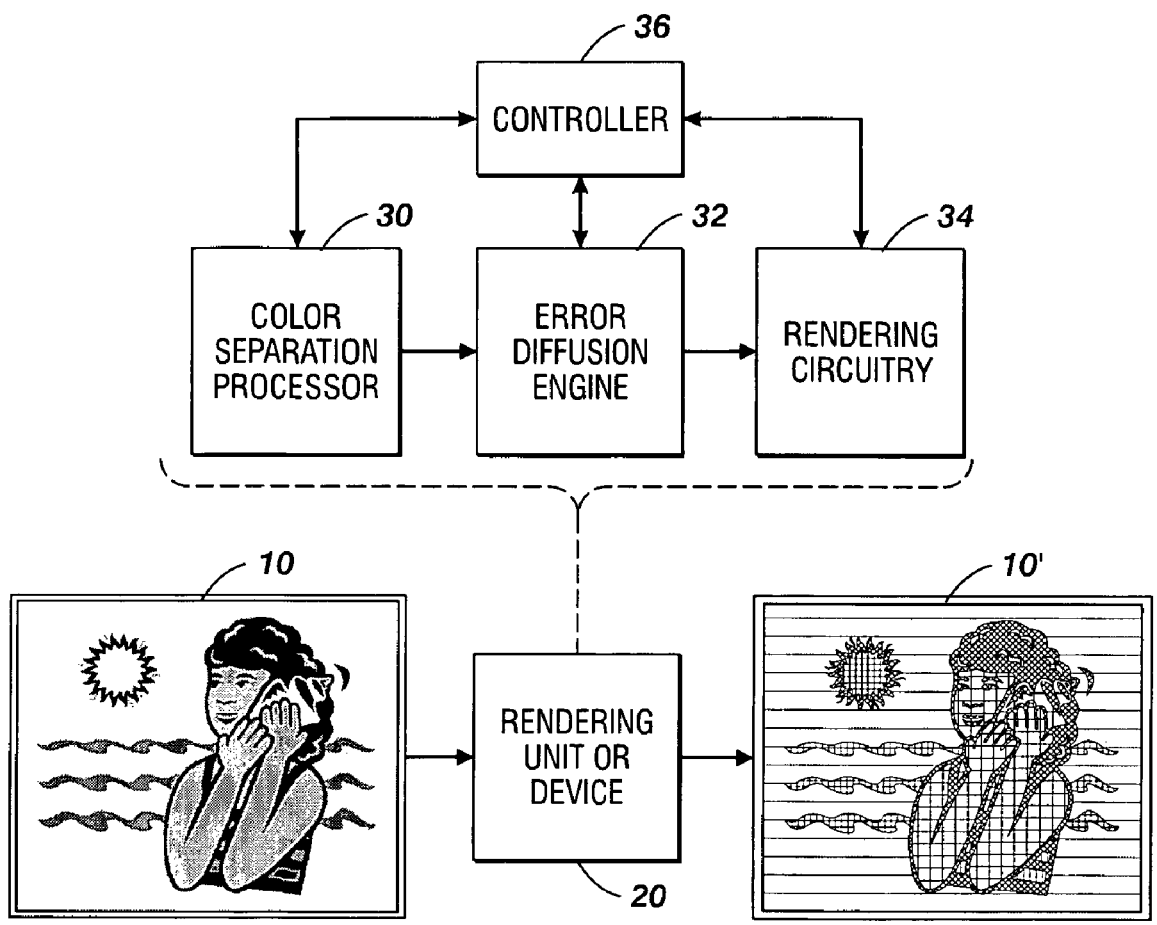
FIG. 3 is a schematic illustration of a process of halftoning the image of FIG. 1 using an error diffusion halftoning method according to one embodiment of the invention.

As illustrated in the schematic view of FIG. 3, an image, such as image 10, may be processed by a rendering unit or device 20, to create a halftoned image 10'. The rendering unit 20 may be any of the devices described above. Additionally, the term "rendering unit" may be construed to cover that portion of a larger device, such as a multifunction document processing system, that performs the halftoning operations.

As shown in FIG. 3, the illustrated unit or device 20 may comprise a number of elements to facilitate halftoning in accordance with the methods described herein. Specifically, as shown in FIG. 3, the illustrated unit or device 20 comprises, among other elements not shown in FIG. 3 or discussed herein, a color separation processor 30, an error diffusion engine 32, rendering circuitry 34, and a controller 36. Color separation processor separate a source image having a given color scheme into color separations of a different color scheme. Error diffusion engine performs error diffusion processing on the color separations. Controller 36 controls error diffusion engine 30 to halftone a source image. The halftoning comprises error diffusion processing of a first separation of plural color separations of a pre-rendered image after error diffusion processing a second separation of the plural color separations of the pre-rendered image. The error diffusion processing of the first separation includes, for respective pixel values corresponding to the first separation, choosing respective magnitudes of the respective pixel values as a function of the error diffusion processing of the second separation. The terms "first" and "second" do not imply any order or other relationship between the separations, except that the separation mentioned "first" in the paragraph is therefore called the "first separation."

Rendering circuitry 34 outputs a rendered image comprising the same plural color separations. The output rendered image is populated with, for the first separation, pixel information based on the respective magnitudes.

Figure 4:
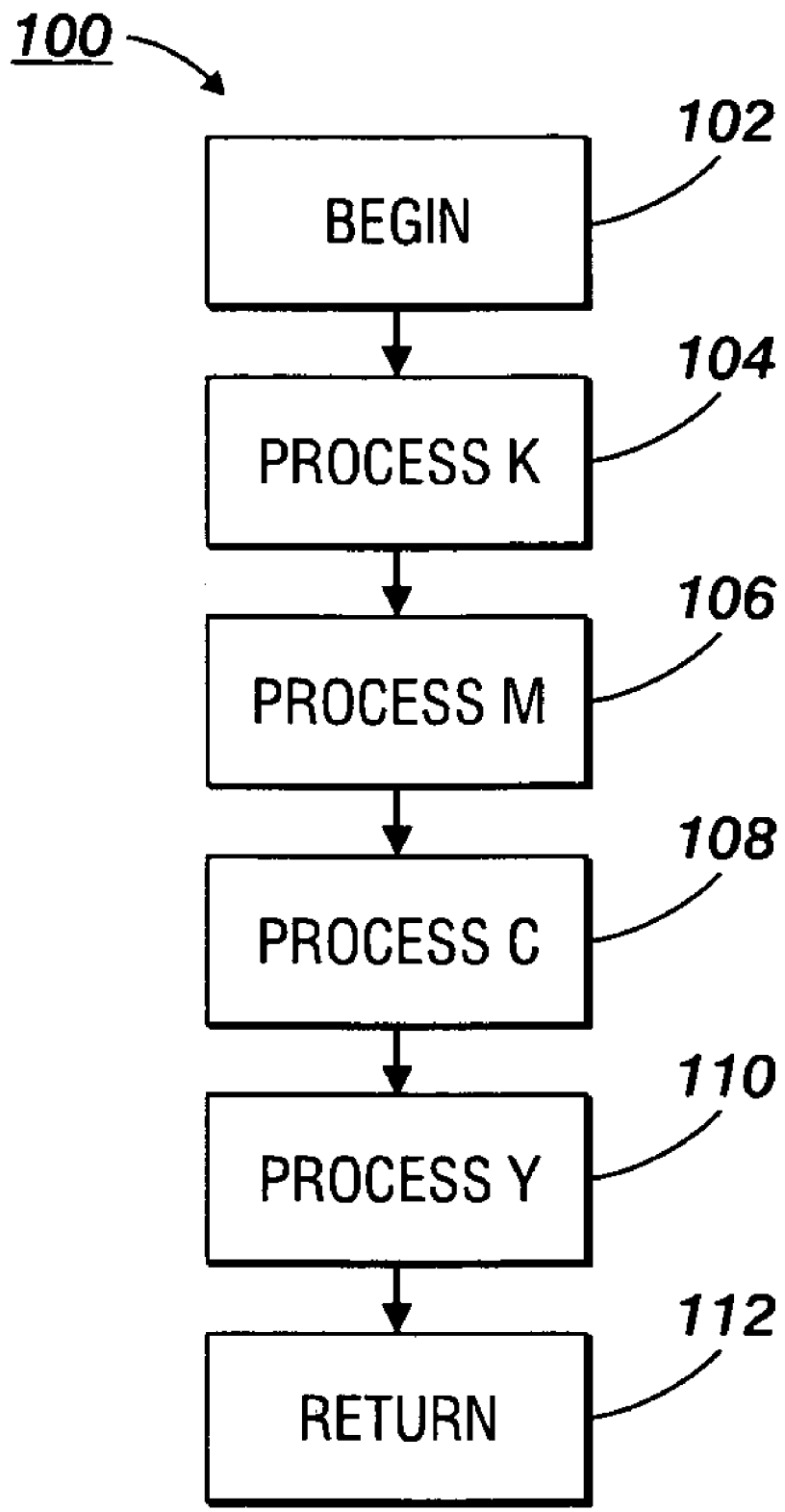
FIG. 4 is a high-level flow diagram showing, for the illustrated embodiment, an order in which the color separations are processed.

In operation of the illustrated device or unit, a source image is halftoned, and a rendered (target) image is then output. In halftoning the source image, error diffusion processing is performed on a first separation of plural color separations of a pre-rendered image, after error diffusion processing is performed on a second separation of the plural color separations of the pre-rendered image. As shown in FIG. 4, and as more fully described below, the set of separations may comprise C, M, Y, and K, and each separation in the pre-rendered image may be processed. Specifically, the separations may be processed in a given sequential order.

The error diffusion processing of the first separation comprises, for respective pixels of the first separation, choosing respective magnitudes of the respective pixels as a function of the error diffusion processing of the second separation. More specifically, the pixel information may represent a selection of an image pixel in the rendered image as active or inactive for the first of the plural color separations. When the first separation at a given image pixel is selected as active, a dot may be displayed or printed in the color of the first separation at the location within the rendered image corresponding to the given pixel.

The error diffusion processing may be performed on each of the plural separations in a given sequential order. In addition, outputting of the rendered image may comprise, for each output color separation, selecting image dots or pixels as active if a modified input for the image dot or pixel is greater than a particular threshold constant determined as a function of an error diffusion value associated with a corresponding dot or pixel in a previously processed color separation. Otherwise, image dots or pixels may be selected as inactive.

The modified errors may comprise errors weighted by at least one impact parameter. The impact parameter determines, at least in part, the impact of one of the color separations on others of the color separations.

An example implementation of this process is shown in more detail in FIG. 5, described below.

Figure 5:
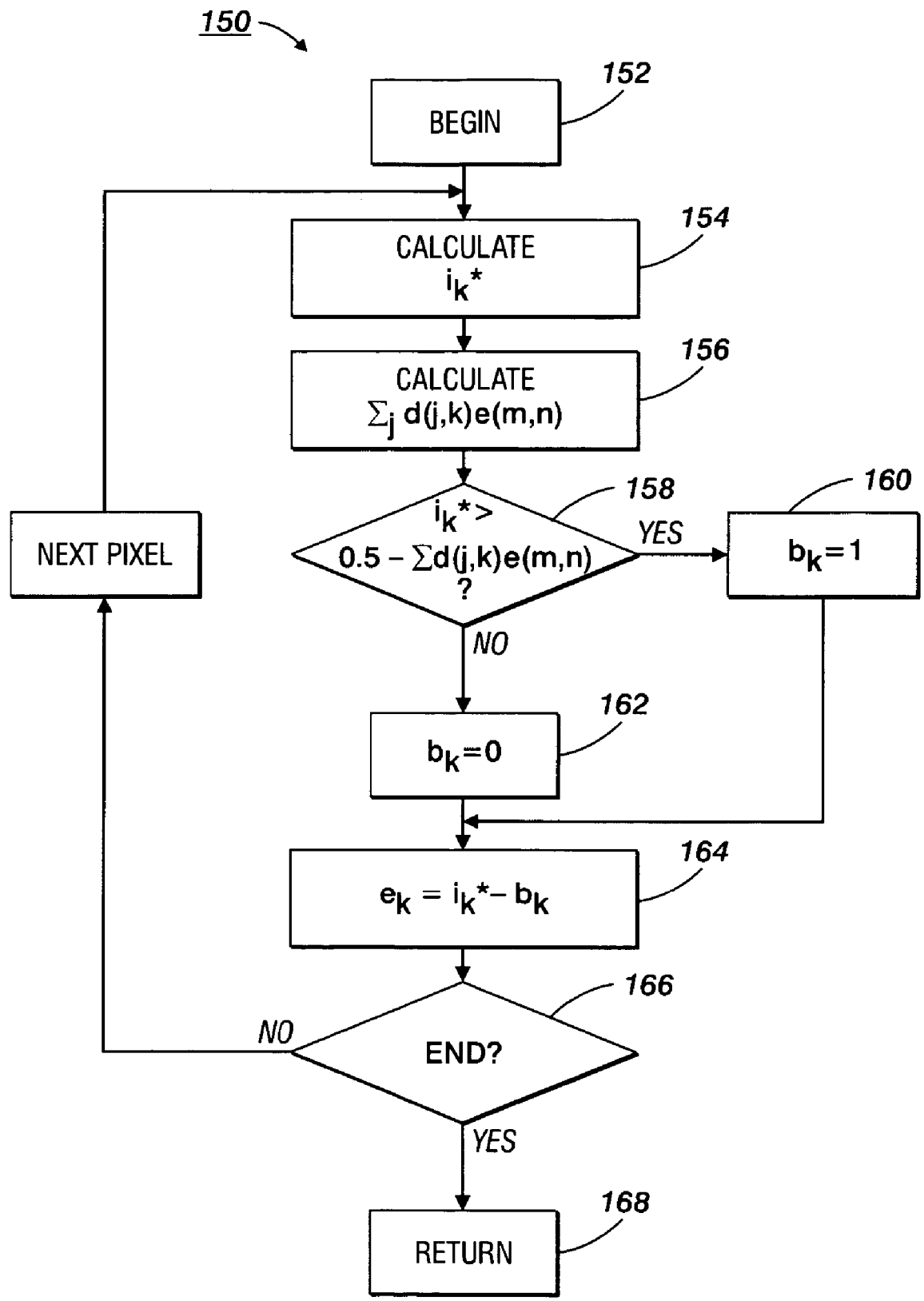
FIG. 5 is a flow diagram showing an exemplary method of processing a given color separation in accordance with the illustrated embodiment.

In the embodiment shown in FIGS. 4 and 5, the color separations 12, 14, 16, 18 of image 10 are processed in order from greatest to least visual impact, taking into account the errors from previously processed separations.

FIG. 4 is a high-level schematic flow diagram illustrating a method 100 for halftoning the image of FIG. 1. In particular, method 100 illustrates an order in which the color separations are processed. Image 10 contains a discrete number of pixels, and that image 10 has been separated so that it is represented by color separations 12, 14, 16, 18.

In method 100, the color separations 12, 14, 16, 18 of image 10 are processed in order according to their degree of visual impact on the perception of the overall image. Thus, the order in which they are processed may be set in accordance with the range and response characteristics of the human visual system. For example, in the CMYK color space, for example, the black (K) separation may be processed first, followed by that of the next most visually affecting color, magenta. Specifically, method 100 begins at act 102 and continues with act 104, in which the black separation 18 is processed. Following act 104, the magenta separation 14 is processed at act 106, the cyan separation 12 is processed at act 108, and the yellow separation 16, which has the least overall effect on the perception of the image, is processed last at act 110 before method 100 completes and returns at act 112. Although a particular processing order is specifically illustrated in method 100 of FIG. 4, other orders of processing may be used. For example, it may be determined that in a particular rendering operation, cyan is more visually affecting than magenta and should thus be processed first.

Error diffusion may be performed using the following equations:

$$i^*(m,n) = i(m,n) + \Sigma_{s,t} e(m-s, n-t) a(s,t) \quad (1)$$

$$b(m,n) = Q[i^*(m,n)] \quad (2)$$

$$e(m,n) = i^*(m,n) - b(m,n), \quad (3)$$

In the above set of equations: $i(m,n)$ and $b(m,n)$ are input and output vectors for the pixel located at coordinates $(m,n)$; $i^*(m,n)$ and $e(m,n)$ are modified input and error; $a(s, t)$ represents the error diffusion coefficients toward direction $(s,t)$; and $Q[.]$ represents a quantization operation. Equation (1) generates a modified input as the sum of the original input and any error diffused from other pixels to the input pixel. Equation (2) quantizes the modified input to produce the binary output. Equation (3) is a calculation of the error.

In the illustrated embodiment, b, the output vector for any particular pixel in the image, is calculated based upon the error made in quantizing the same pixel in previously-processed separations. Specifically, b in the illustrated embodiment may be calculated using Equation (4) below. In simplified form, for every color separation k:

$$b_k(m,n) = 1, \text{ if } i_k^*(m,n) > 0.5 - \Sigma_j d(j,k) e_j(m,n); \quad (4)$$

0, otherwise;

wherein k is a color index (e.g., k=C, M, Y, or K for a CMYK printer), $e_j$ (m, n) is the error made at the pixel in previously processed color separation j, and d(j, k) is a typically non-negative coefficient that describes the effect of one color separation on another.

The summation in Equation (4) extends over all of the color separations that have already been processed. Therefore, using method 100 as an example, the black separation 18 is essentially processed as in scalar error diffusion (that is, because there are no other processed separations to take into account and the summation term is thus zero), the magenta separation 14 is processed taking into account the error made in processing the black separation 18, the cyan separation 12 is processed taking into account error made in processing the magenta and black separations 14, 18, and the yellow separation 16 is processed taking into account the error made in processing all three other separations, 12, 14, 18. In error diffusion, the error is actually a low-passed version of the difference between input and output. Therefore, in this scheme the influence is not restricted to a single pixel location (m,n) and instead extends to the vicinity of pixel (m,n). Thus, with this scheme, assuming d(j,k) is positive, an "on" or active dot or pixel in the black separation 18 will generally result in a negative error, raising the threshold for $i_k$* and thus discouraging an "on" or active dot or pixel on the magenta separation 14 at location (m,n) and its vicinity. This allows most halftones produced by these error diffusion methods to have smoother textures than those produced by other error diffusion methods.

The coefficient d(j,k) maybe set empirically based on user experience and the desired application. An example set of values for d(j,k) for some applications in a CMYK color scheme is set forth in Parameter Set (5):

$$d(K,M)=1, d(K,C)=1, d(K,Y)=1 \quad (5)$$

$$d(M,C)=0.5, d(M,Y)=0.25, d(C,Y)=0.25$$

As shown, the values of d(j,k) may vary for each separation with respect to the others. Larger values of d(j,k) increase the impact of one color separation on the others. However, if the values of d(j,k) are too large, color smearing may occur at the edges of the image. This type of artifact may be reduced by error clipping. The modified input $i_k$* of Equation (4) may be calculated using Equation (1) using any appropriate parameter values. Stated otherwise, the extent and direction of error diffusion, and the size of affected neighborhoods of pixels, may be set as appropriate for the application, and may be modified based on empirical results.

FIG. 5 is a flow diagram illustrating a method, generally indicated at 150, of halftoning each of the separations 12, 14, 16, 18, as indicated in method 100 of FIG. 4. Method 150 is performed for each pixel in each separation, and begins at act 152. At act 154, $i_k$* for the pixel is calculated, and control passes to act 156. At act 156, the error summation $\Sigma_j d(j, k) e_j(m,n)$ for the pixel is calculated, and control passes to act 158, a decision task.

In act 158, it is decided whether $i_k$* is greater than the threshold, that is, whether $i_k$* is greater than 0.5 minus the error summation term calculated at act 156. If $i_k$* is greater than the threshold (act 158:YES), $b_k$ is set equal to one at act 160; otherwise (act 158:NO) $b_k$ is set equal to zero. Following act 160 or act 162, the error component is calculated at act 164, and control passes to act 166. At act 166, if all of the pixels have been processed (act 166:YES), method 150 terminates and returns at act 168. If all of the pixels have not been processed (act 166:NO), control of method 150 returns to act 154, and method 150 continues for the next pixel. Method 150 is repeated for each of the color separations, as was described above.

The error diffusion halftoning methods 100, 150 described herein may be implemented in hardware components, in software, or in some mix of hardware and software. For example, if the rendering device 20 used to implement the methods has a general purpose microprocessor, the acts of methods 100, 150, or other similar methods, may be encoded in a set of processor instructions that is stored in an appropriate machine or computer readable medium, be it a magnetic storage medium, an optical storage medium, random access memory, read only memory, flash memory, or any other form of machine or computer readable medium. Additionally or alternatively, the tasks involved in methods 100, 150 and other similar methods may be encoded in or with a special purpose microprocessor, an ASIC, or another type of computing device or set of devices adapted to perform the tasks of the methods. The tasks of the methods 100, 150 may be coded in any programming language that is capable of executing them and that is compatible with the rendering system that is to be used.

In some implementations, the presence and function of these error diffusion methods may be nearly invisible to the end user. That is, an input image may simply be halftoned and the output displayed or printed for the user without the need for any particular user input. Other implementations may allow the user to modify the parameters of the error diffusion, notably the values of d(j,k), either directly or indirectly. For example, suitable values of d(j,k) could be included in a look up table or other type of storage, and the controlling software or hardware could allow the user to select between the values without direct knowledge of the values of the underlying parameters themselves. For example, the user might be given the option of modifying the "halftone structure" for each separation in the image, with each value of "halftone structure" mapped to a particular set of values for the parameter d(j,k).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method comprising:

halftoning a source image, thereby converting multiple-level pixel input values, of each of plural color separations of a pre-rendered image, to binary output pixel values, the halftoning including error diffusion processing of a first separation of the plural color separations of the pre-rendered image after error diffusion processing a second separation of the plural color separations of the pre-rendered image, the error diffusion processing of the first separation comprising, for respective ones of the multiple-level input pixel values of the first separation, choosing corresponding binary output pixel values as a function of the error diffusion processing of the second separation;

outputting a rendered image including the same plural color separations, the output rendered image being populated with, for the first separation, pixel information based on the respective magnitudes; and printing or displaying the output for each color separation to produce a halftoned image;

wherein error diffusion processing is performed on each of the plural color separations in a given sequential order, and wherein the outputting of the rendered image comprises, for each output color separation, selecting image dots or pixels as active if a modified input for the image dot or pixel is greater than a particular threshold determined as a function of an error value associated with a corresponding dot or pixel in a previously processed color separation, and selecting image dots or pixels as inactive otherwise, the error value being calculated by determining a difference between an output of the previously processed color separation and a modified input of the previously processed color separation.

2. The method of claim 1, wherein the pixel information represents a selection of an image pixel in the rendered image as active or inactive for the first separation.

3. The method of claim 2, wherein when the first separation at a given image pixel is selected as active, a dot is displayed or printed in the color of the first separation at the location within the rendered image corresponding to the given pixel.

4. The method of claim 1, wherein the error value includes modified errors weighted by at least one impact parameter, the impact parameter determining, at least in part, the impact of one of the color separations on others of the color separations.

5. The method of claim 1, wherein the modified input for the image pixel or dot comprises an original intensity value of the image dot or pixel and an error component diffused from neighboring image dots or pixels.

6. The method of claim 1, wherein the color separations are cyan, magenta, yellow, and black, and wherein the given sequential order is black, magenta, cyan, and yellow.

7. The method of claim 1, further comprising, before the halftoning, separating the source image having a given color scheme into the color separations of a different color scheme.

8. The method of claim 1, wherein the outputting of the rendered image includes outputting, for each color separation, for each pixel or dot within a given color separation k, a "1" when a modified input for the same pixel or dot is greater than a threshold value minus the sum of the products of an impact parameter times an error value for each of the previously processed color separations.

9. A method comprising:
halftoning a source image, the halftoning including error diffusion processing of a first separation of the plural color separations of a pre-rendered image after error diffusion processing a second separation of the plural color separations of the pre-rendered image, the error diffusion processing of the first separation comprising, for respective pixel values corresponding to the first separation, choosing respective magnitudes of the respective pixel values as a function of the error diffusion processing of the second separation;
outputting a rendered image including the same plural color separations, the output rendered image being populated with, for the first separation, pixel information based on the respective magnitudes; and
printing or displaying the output for each color separation to produce a halftoned image;
wherein error diffusion processing is performed on each of the plural color separations in a given sequential order, and wherein the outputting of the rendered image comprises, for each output color separation, selecting image dots or pixels as active if a modified input for the image dot or pixel is greater than a particular threshold determined as a function of an error value associated with a corresponding dot or pixel in a previously processed color separation, and selecting image dots or pixels as inactive otherwise; and
wherein the outputting of the rendered image includes outputting, for each color separation, for each pixel or dot within a given color separation k, a "1" when a modified input for the same pixel or dot is greater than 0.5 minus the sum of the products of an impact parameter times an error value for each of the previously processed color separations.

10. A machine-readable medium comprising encoded information, the encoded information, when operably interacting with the machine, causing:
halftoning of a source image, thereby converting multiple-level pixel input values, of each of plural color separations of a pre-rendered image, to binary output pixel values, the halftoning including error diffusion processing of a first separation of the plural color separations of the pre-rendered image after error diffusion processing a second separation of the plural color separations of the pre-rendered image, the error diffusion processing of the first separation including, for respective ones of the multiple-level input pixel values of the first separation, corresponding binary output pixel values as a function of the error diffusion processing of the second separation;
outputting of a rendered image comprising the same plural color separations, the output rendered image being populated with, for the first separation, pixel information based on the respective magnitudes; and
performing error diffusion processing on each of the plural color separations in a given sequential order, wherein the outputting of the rendered image includes, for each output color separation, selecting image dots or pixels as active if a modified input for the image dot or pixel is greater than a particular threshold determined as a function of an error value associated with a corresponding dot or pixel in a previously processed color separation, and selecting image dots or pixels as inactive otherwise, the error value being calculated by determining a difference between an output of the previously processed color separation and a modified input of the previously processed color separation.

11. The machine-readable medium of claim 10, wherein the pixel information represents a selection of an image pixel in the rendered image as active or inactive for the first separation.

12. The machine-readable medium of claim 11, wherein when the first separation at a given image pixel is selected as active, a dot is displayed or printed in the color of the first separation at the location within the rendered image corresponding to the given pixel.

13. The machine-readable medium of claim 10, wherein the error value includes modified errors weighted by at least one impact parameter, the impact parameter determining, at least in part, the impact of one of the color separations on others of the color separations.

14. Apparatus comprising:
a color separation processor to separate a source image having a given color scheme into color separations of a different color scheme;
an error diffusion engine;
a controller to control the error diffusion engine to halftone a source image, thereby converting multiple-level pixel input values, of each of plural color separations of a pre-rendered image, to binary output pixel values, the halftoning including error diffusion processing of a first separation of the plural color separations of the pre-rendered image after error diffusion processing a second separation of the plural color separations of the pre-rendered image, the error diffusion processing of the first separation including, for respective ones of the multiple-level input pixel values of the first separation, corresponding binary output pixel values as a function of the error diffusion processing of the second separation; and rendering circuitry to output a rendered image including the same plural color separations, the output rendered image being populated with, for the first separation, pixel information based on the respective magnitudes;

wherein the error diffusion processing is controlled by the controller to be performed on each of the plural color separations in a given sequential order, and wherein the output of the rendered image comprises, for each output color separation, selecting image dots or pixels as active if a modified input for the image dot or pixel is greater than a particular threshold determined as a function of an error value associated with a corresponding dot or pixel in a previously processed color separation, and selecting image dots or pixels as inactive otherwise, the error value being calculated by determining a difference between an output of the previously processed color separation and a modified input of the previously processed color separation.

15. The apparatus of claim 14, wherein the pixel information represents a selection of an image pixel in the rendered image as active or inactive for the first separation.

16. The apparatus of claim 15, wherein when the first separation at a given image pixel is selected as active, a dot is displayed or printed in the color of the first separation at the location within the rendered image corresponding to the given pixel.

17. The apparatus of claim 14, further comprising a rendering unit to print or display the output produced by the rendering circuitry.

18. The apparatus of claim 14, wherein the apparatus comprises at least one of a document processing system, a printer, and a computer.

* * * * *